US010577694B2

(12) United States Patent
Choi et al.

(10) Patent No.: US 10,577,694 B2
(45) Date of Patent: Mar. 3, 2020

(54) PROTECTIVE ALUMINUM OXIDE SURFACE COATINGS AND LOW-TEMPERATURE FORMING PROCESS FOR HIGH-TEMPERATURE APPLICATIONS

(71) Applicant: BATTELLE MEMORIAL INSTITUTE, Richland, WA (US)

(72) Inventors: Jung-Pyung Choi, Richland, WA (US); Jeffry W. Stevenson, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 0 days.

(21) Appl. No.: 15/867,370

(22) Filed: Jan. 10, 2018

(65) Prior Publication Data

US 2018/0187311 A1 Jul. 5, 2018

Related U.S. Application Data

(63) Continuation-in-part of application No. 15/200,790, filed on Jul. 1, 2016, which is a continuation-in-part
(Continued)

(51) Int. Cl.
C23C 22/82 (2006.01)
H01M 8/0245 (2016.01)
(Continued)

(52) U.S. Cl.
CPC ............ C23C 22/82 (2013.01); C23C 10/18 (2013.01); C23C 10/30 (2013.01); C23C 10/60 (2013.01);
(Continued)

(58) Field of Classification Search
CPC ..................................................... C23C 22/82
See application file for complete search history.

(56) References Cited

U.S. PATENT DOCUMENTS 3,578,482 A    5/1971   Whitaker et al.
4,228,203 A *  10/1980  Yagi ...................... C23C 24/106
                                                       148/512
(Continued)

OTHER PUBLICATIONS

Bianco, R., et al., Codepositing Elements by Halide-Activated Pack Cementation, The Journal of the Minerals, Metlas & Materials Society, Nov. 1991, 43, 11, 20-25.
(Continued)

Primary Examiner — Robert A Vetere
(74) Attorney, Agent, or Firm — Wells St. John P.S.

(57) ABSTRACT

A method of both coating a substrate with aluminum oxide and infusing the substrate with elemental aluminum is disclosed. In one example, the method includes providing a metal powder/polymer binder slurry, the slurry having a solvent, an organic binder, metal granules and a seed element, wherein the metal granules include Al; dispersing the slurry upon a Cr-containing surface; after dispersing the slurry, exposing the slurry to air and maintaining the temperature of the slurry and substrate below 110° C. to remove at least a portion of the solvent from the slurry; and, in a combined step, both exposing the binder, metal granules and substrate to air and heating the remaining slurry and substrate at a temperature less than or equal to 1000° C. to both diffuse at least a portion of the metal of the metal granules into the substrate and coat the substrate with aluminum oxide.

20 Claims, 10 Drawing Sheets

Related U.S. Application Data of application No. 12/469,888, filed on May 21, 2009, now Pat. No. 9,481,923.

(51) Int. Cl.
  *F16L 58/14* (2006.01)
  *F22B 37/10* (2006.01)
  *C23C 22/02* (2006.01)
  *C23C 10/18* (2006.01)
  *C23C 10/60* (2006.01)
  *C23C 10/30* (2006.01)

(52) U.S. Cl.
  CPC .............. *C23C 22/02* (2013.01); *F16L 58/14* (2013.01); *F22B 37/107* (2013.01); *H01M 8/0245* (2013.01)

(56) References Cited

U.S. PATENT DOCUMENTS

| | | | |
|---|---|---|---|
| 4,729,912 | A | 3/1988 | Kilbane et al. |
| 5,399,438 | A * | 3/1995 | Tateishi ............... B22F 7/08 419/10 |
| 6,444,054 | B1 | 9/2002 | Kircher |
| 6,541,146 | B1 | 4/2003 | Xue et al. |
| 7,056,555 | B2 | 6/2006 | Bauer et al. |
| 2002/0076488 | A1 | 6/2002 | Park et al. |
| 2002/0094445 | A1 | 7/2002 | Sangeeta et al. |
| 2004/0180232 | A1 | 9/2004 | Das et al. |
| 2007/0023142 | A1 | 2/2007 | LaGraff et al. |
| 2007/0298166 | A1 | 12/2007 | Kool et al. |
| 2008/0081214 | A1 * | 4/2008 | Narita ............. C22C 27/00 428/665 |
| 2016/0222803 | A1 * | 8/2016 | Livings ............ C23C 10/04 |
| 2018/0073123 | A1 * | 3/2018 | Lin ............. F01D 25/005 |

OTHER PUBLICATIONS

Frangini, S., Inetemetallic FeAl based coatings deposited by the electrospark technique: corrosion behavior in molten (Li+K) carbonate, Surface and Coatings Technology, 184, 2004, 31-39.

Moore, W. J., et al., The Crystal Structures of the Tetragonal Monoxides of Lead, Tin, Palladium, and Platinum, Journal of the American Chemical Society. , 1941, vol. 63(5), 1392-1394.

Rao, C. N. R., et al., Transition Metal Oxides, Crystal Chemistry, Phase Transition and Related Aspects, Department of Chemistry, Indian Institute of Technology, Kanpur-16 India, Library of Congress Catalog No. 73-600267, Nat. Stand. Ref. Data Ser., Nat. Bur Stand., US, 49, 138 Pages, Jun. 1974.

Tian, X., et al., Structure of Al-modified silicide coatings on an Nb-based ultrahigh temperature alloy prepared by pack cementation techniques, Surface & Coatings Technology, 203, 2009, 1161-1166.

Zhu, X., et al., Microstructure and corrosion resistance of Fe—Al intermetallic coating on 45 steel synthesized by double glow plasma surface alloying technology, Trans. Nonferrous Met Soc. China, 19, 2009, 143-148.

* cited by examiner

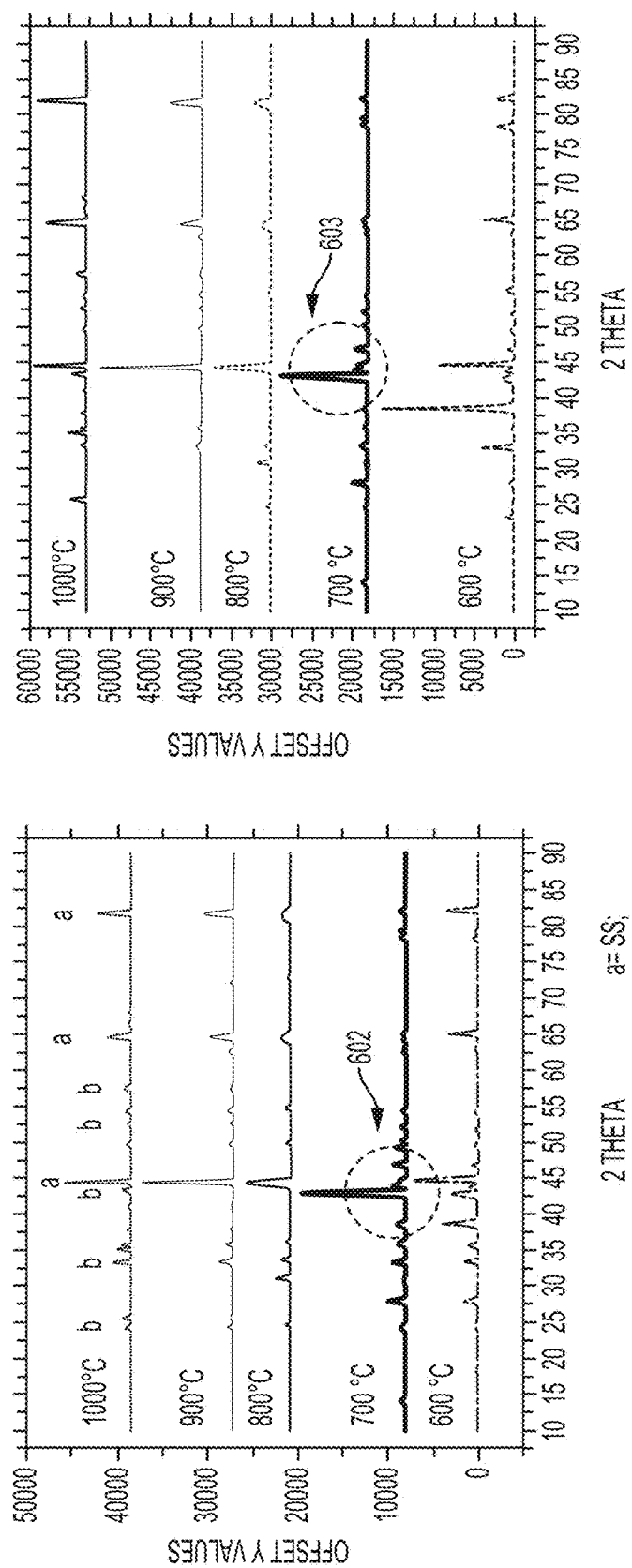

AI WITH NO SEED ELEMENT

PROTECTIVE ALUMINUM OXIDE SURFACE COATINGS AND LOW-TEMPERATURE FORMING PROCESS FOR HIGH-TEMPERATURE APPLICATIONS

CROSS-REFERENCE TO RELATED APPLICATIONS

This invention claims priority from and is a continuation-in-part application of currently U.S. patent application Ser. No. 15/200,790, filed Jul. 1, 2016, which is a continuation-in-part application of U.S. application Ser. No. 12/469,888, filed May 21, 2009, now U.S. Pat. No. 9,481,923. The applications are incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

FIELD OF THE INVENTION

The present invention relates to forming metal-containing coatings on substrates, and relates more particularly to coating a substrate with aluminum oxide and infusing the substrate with elemental aluminum.

BACKGROUND

Ferritic stainless steels that include chromium (Cr) as a constituent in the metal are preferred metals for devices and systems that operate at high-temperature because of their resistance to oxidation and their low relative cost including interconnect materials for Solid Oxide Fuel Cells (SOFCs), solar cells, and nuclear power plants. However, at high operating temperatures, chromium in these ferritic steels can form various volatile chromium oxides (chromia) within the metal matrix including $CrO$, $CrO_2$, $CrO_3$, $CrO_5$, $Cr_2O_3$, $Cr2O7$, $Cr_8O_{21}$, and $CrO_2(OH)_2$, for example. When released from the metal, these species can preferentially adsorb to oxygen catalysis sites at electrolyte interfaces within the device cells including the cathode which can poison high-temperature reactions occurring in these devices or degrade power outputs in fuel cell systems at typical SOFC operating temperatures. Consequently, protective coatings on metal surfaces and substrates within these devices are required for operation. However, even when protective coatings are applied, chromia layers can form at the surface of these steels when the steels are exposed to high temperatures. High-temperature exposure can also weaken the coating bond strength at the surface and lead to flaking in a process called spallation. Flaking can lead to evaporation losses of chromium and chromium metal oxides from the matrix of these steels due to the formation of gaseous $CrO_3$ and $CrO_2(OH)_2$ at high temperatures higher than about 600° C. which can weaken or embrittle the steels. While ceramic electrically conductive oxide coatings such as chromium manganite spinels can mitigate chromium volatility in interconnecting components, spinels are not easily applied to in-stack parts and other plant components in operation. In these atypical cases, aluminum-based coatings can provide more significant functionality including low-cost application, long-term oxidation resistance, reduced chromium evaporation, and improved seal durability. A previous innovation by these inventors was a Reactive Air Aluminization (RAA) process that formed protective aluminum oxide coatings on surfaces of assembled devices comprised of ferritic steel alloys at a typical process temperature of 1,000° C. that was significantly below conventional alumina-forming temperatures of 1,200° C. These RAA coatings provide suitably strong resistance to spalling and prevent the release of chrome from the coated substrates thus preventing cathode poisoning, and embrittlement of the steel alloy substrates often encountered at high operating temperatures in these devices. These protective coatings cannot be adequately produced on some specialty metals and alloys that have even lower melting temperatures. Accordingly, a need exists for low-temperature methods of forming protective alumina coatings on surfaces of metals and substrates for specialty applications and/or for reducing manufacturing and/or fabrication costs.

SUMMARY

A method for low-temperature forming of protective aluminum oxide coatings at surfaces of metallic (metal and metal alloy) substrates for high-temperature applications is disclosed. In some embodiments, the aluminum oxide is (α)-alumina. In some embodiments, the method can result in both a coating on a surface of a metal substrate and an infusion with elemental aluminum into a surface region of the substrate. In certain embodiments, the infusion comprises a penetration/diffusion zone comprised of a gradient of aluminum metal within the matrix of the metallic substrate beneath the alumina coating. The penetration/diffusion zone can serve to help anchor the alumina coating on the surface and can exist at particular depths with certain thicknesses according to processing conditions as described herein. The protective coatings can be strongly bound to the surface of the metallic substrates enabling these coatings to resist spalling from the surface and to prevent release of volatile chromium species from the matrix of these metal substrates during subsequent exposure at sustained high temperatures enabling these coated substrates to be utilized in high temperature devices and high temperature applications.

Embodiments described herein can occur in oxygen-containing environments, including in air, which can greatly simplify the process and the cost of applying the coating. For example, embodiments described herein can eliminate the need for evacuated or reduced oxygen atmospheres traditionally required for aluminum oxide coating formation.

In some embodiments, a method for both coating a substrate with aluminum oxide and infusing the substrate with elemental aluminum, comprises providing a substrate having a Cr-containing surface; providing a metal powder/polymer binder slurry, the slurry comprising a solvent, an organic binder, metal granules and a seed element, wherein the metal granules comprise Al; dispersing the slurry upon the Cr-containing surface; after dispersing the slurry, exposing the slurry to air and maintaining the temperature of the slurry and substrate below 110° C. to remove at least a portion of the solvent from the slurry; and after removing at least a portion of the solvent from the slurry, in a combined step, both exposing the binder, metal granules and substrate to air and heating the remaining slurry and substrate at a temperature less than or equal to 1000° C. to both diffuse at least a portion of the metal of the metal granules into the substrate and coat the substrate with aluminum oxide. In some embodiments, the temperature is between 700° C. to 900° C., inclusive.

In certain embodiments, the step of maintaining the temperature of the slurry and substrate further comprises maintaining the temperature at a value of at least 40° C. In other embodiments, the temperature is at least 80° C. In other embodiments, the temperature is between 90° C. and 100° C. In certain embodiments, the seed element comprises Ti. In certain embodiments, the seed element comprises Cr. In certain embodiments, the seed element comprises Mn. In certain embodiments, the seed element comprises Fe. In certain embodiments, the seed element can comprise Group V metals, Group VI metals, or both, particularly those Group V and/or Group VI metals that form metal oxides having a cubic or a tetragonal crystal structure. In certain embodiments, the seed element can comprise Group IB metals, Group IIB metals, Group IIIB metals, Group IVB metals, Group VB metals, Group VIB metals, Group VIIB metals, and Group VIII metals, or mixture, particularly those Group IVB metals, VB metals, VIB metals, VIIB metals, and Group VIII metals that form metal oxides having a cubic or a tetragonal or a trigonal crystal structure.

In some embodiments, the substrate has a surface containing Cr, Fe, or both Cr and Fe. In certain embodiments, the Cr and/or Fe containing surface further comprises Co, Ni, or both Co and Ni. In certain embodiments, the metal granules have an average diameter between 0.1 and 45 µm, inclusive. In certain embodiments, the metal powder/polymer binder slurry comprises organic constituents that carburize and/or volatilize at temperatures near or above the melting point of the metal. In certain embodiments, during the combined step at least a portion of the aluminum is oxidized. In certain embodiments, the metal of the metal granules comprises an aluminum alloy. In certain embodiments, the binder of the metal powder/polymer binder slurry is an organic-based system having a final evaporation or decomposition temperature greater than 100° C. In certain embodiments, during the exposing the slurry to air and maintaining the temperature of the slurry and substrate below 110° C. step, the metal of the metal powder/polymer binder slurry remains unoxidized. In certain embodiments, the metal powder/polymer binder slurry comprises a ratio of binder to powder within the range of 10:1 to 1:10 by volume. In certain embodiments, the dispersing the slurry upon the Cr-containing surface comprises applying the slurry by spray dispensing, paste dispensing, painting, dip coating, stencil printing, or screen printing. In certain embodiments, wherein the aluminum oxide comprises α-aluminum oxide. In certain embodiments, the methods described herein can be operated as a continuous process on one or more substrates at a time. In certain embodiments, the metal substrate is a component of a solid oxide fuel cell stack or a boiler device In some embodiments, the low-temperature formation includes introducing metal powder/polymer binder slurry or other carrier medium having precursors and reactants for forming the aluminum oxide coating and the surface region having infused aluminum. The precursors and reactants in the metal powder/polymer binder slurry can include a metal powder comprising aluminum and at least one other seed element combined with a binder and an organic solvent. The metal powder/polymer binder slurry, suspension, or paste can be applied to the surface of the substrate by any method that forms a uniform layer such as spray deposition; painting; printing; roll casting; and combinations of these various techniques. Other methods of delivery can be envisioned.

The process can yield an alpha (α)-aluminum oxide coating on a surface of a metallic substrate.

Viscosities of the metal powder/polymer binder slurry are not intended to be limited. Viscosities can be selected based on the intended method of delivery of the metal powder/polymer binder slurry. The dried metal powder/polymer binder slurry can be slowly heated to the chosen alumina forming temperature at a selected ramping rate. In one embodiment, ramp rates can be selected from below about 3° C. per minute. For example, in some embodiments, the ramping temperature is selected from about 3° C. per minute to about 15° C. per minute. Other ramping temperatures can also be utilized. In general, lower ramping temperatures allow oxidation of both the aluminum metal and the seed elements from the metal powder/polymer binder slurry to take place.

The layer comprising dried metal powder/polymer binder slurry can be heated at a selected alumina-forming temperature for a time sufficient to form a protective alumina coating on the surface of the substrate with a selected aluminum penetration depth in the matrix of the substrate. Alumina-forming temperatures are selected from about 600° C. to about 1500° C. Preferred alumina-forming temperatures are below about 1000° C., for example, from about 600° C. to less than about 1000° C., and more preferably from about 700° C. to about 900° C. The metal-containing precursors containing aluminum metal and other selected seed elements form alumina coatings at lower process temperatures compared to aluminum metal alone while simultaneously decreasing the aluminum metal penetration depth (thickness) within the matrix of the metallic substrate. The protective (α)-alumina coating formed on the surface of the metallic substrate along with the corresponding penetration depth (thickness) of aluminum metal in the matrix of the metallic substrate prevents spalling of the coating from the surface and prevents evaporation of volatile chromium species from the matrix of the metallic substrate at high temperature operation. The coatings have a greater strength and a greater resistance to spalling other coatings formed by other processes, especially at the temperatures described herein. Physical properties are also improved.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims nor is it intended to be limiting as to the scope of the invention in any way. Various advantages and novel features of the present invention are described herein and will become further readily apparent to those skilled in this art from the following detailed description. In the preceding and following descriptions, various embodiments of the instant disclosure have been shown and described. As will be realized, the invention is capable of modification in various respects without departing from the invention. Accordingly, the drawings and description of the preferred embodiments set forth hereafter are to be regarded as illustrative in nature, and not as restrictive. Embodiments of the invention are described below with reference to the following accompanying drawings.

BRIEF DESCRIPTION OF THE DRAWINGS

FIGS. 6A-6C are XRD plots showing changes in metal oxide crystal structure as a function of temperature indicating a lower temperature of aluminization when utilizing a seed element, according to embodiments described herein.

FIG. 7A shows comparisons of processes with and without a seed element at an oxidation/diffusion temperature of 800° C. FIG. 7B shows comparisons of methods with and without a seed element at an oxidation/diffusion temperature of 900° C. FIG. 7C shows processing with no seed element at 1000° C. for purposes of comparison with the lower temperature processes described herein.

DETAILED DESCRIPTION

The description provided herein and in the following section includes a description of a preferred embodiment of the present disclosure. It will be clear from this description that the invention is not limited to these illustrated embodiments, but that the invention also includes a variety of modifications and embodiments thereto. While embodiments of the present disclosure are described in reference to chromium (Cr) containing metals and metal alloys due to their relevance to high-temperature devices, applications, and associated processes, the disclosure is not intended to be limited thereto as other metals, and metal alloys may also be utilized as detailed herein. In addition, while embodiments of the instant disclosure will also be described with reference to a metal-containing slurry or paste, the disclosure is not intended to be limited thereto. The metal powder/polymer binder slurry can take any flowable form that permits delivery of the metal powder/polymer binder slurry to the intended metal substrate including suspensions, inks, paints, and other liquid forms and media, for example. Viscosities are also not limited as they can be varied depending on the method selected for delivery or application of the metal powder/polymer binder slurry to surfaces of metal substrates. Thus, the following description of these embodiments is not intended to be limited to any one type of material or delivery method.

Figure 1:
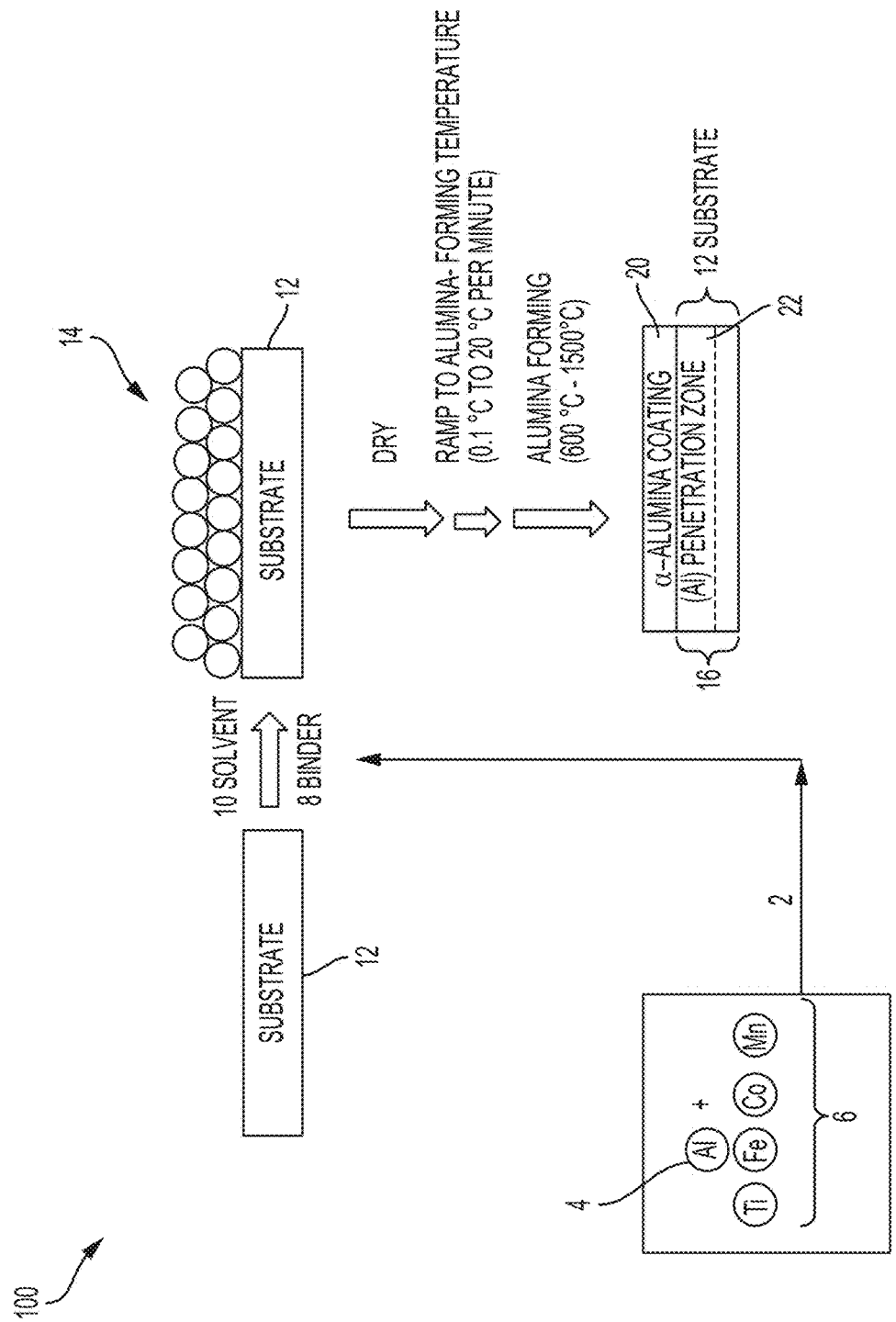
FIG. 1 is a schematic showing one embodiment of a method for both coating a substrate with aluminum oxide and infusing the substrate with elemental aluminum.

FIGS. 1-8 show different embodiments of the present disclosure and aspects for low-temperature forming of alumina coatings on surfaces of metal substrates. Referring first to FIG. 1, one embodiment of a lower temperature forming process for aluminization of surfaces and metallic substrates is shown. The method includes preparing metal powder/polymer binder slurry 14 by combining powders of aluminum (Al) metal 4 and at least one seed element 6 preferably together with a binder 8 and a selected organic solvent 10. Metal powder/polymer binder slurries 14 may have a flowable form including liquid slurries, liquid containing pastes; liquid suspensions, colloidal liquids; liquid paints; liquid inks, or other media, for example, that enable delivery of the metal powder/polymer binder slurry 14 to a metallic substrate 12. Delivery can be by dipping, spraying, coating, spreading, or casting.

Seed elements 6 can include any metal that forms a metal oxide upon oxidation having a cubic crystal (lattice) structure, a tetragonal metal oxide crystal structure, or a trigonal metal oxide crystal structure. Examples of cubic crystal structures can include a body-centered cubic (BCC) metal oxide crystal structure and face-centered (FCC) cubic metal oxide crystal structure. In certain embodiments, the seed element can be added as powders of elemental metals.

In some embodiments, seed elements 6 can be selected from Group D3 to Group VIII metals, non-group elements, and combinations of these metals. In some embodiments, seed elements 6 can include titanium (Ti) metal; chromium (Cr) metal; manganese (Mn) metal; iron (Fe) metal; or combinations of these metals. In some embodiments, seed elements 6 be selected from metals that form cubic crystal structures including, for example, Copper (Cu); Silver (Ag); Cadmium (Cd); Scandium (Sc); Yttrium (Y); Cerium (Ce); Thorium (Th); Samarium (Sm); Europium (Eu); Gadolinium (Gd); Terbium (Tb); Dysprosium (Dy); Holmium (Ho); Erbium (Er); Thulium (Tm); Ytterbium (Yb); Titanium (Ti); Zirconium (Zr); Hafnium (Hf); Niobium (Nb); Chrominum (Cr); Tungsten (W); Manganese (Mn); Rhenium (Re); Iron (Fe); Cobalt (Co); Nickel (Ni); and combinations of these metals. In some embodiments, seed elements can be selected from metals that form tetragonal oxide crystal structures including Titanium (Ti); Hafnium (Hf); Niobium (Nb); Tantalum (Ta); Chromium (Cr); Molybdenum (Mo); Manganese (Mn); Rhenium (Re); Ruthenium (Ru); Rhodium (Rh); Iridium (Ir); Palladium (Pd); and combinations of these metals. In some embodiments, seed elements can be selected from metals that form trigonal oxide crystal structures including Actinium (Ac); Titanium (Ti); Cobalt (Co); and combinations of these metals.

In some embodiments, seed elements 6 can be selected from Group-V metals and Group-VI metals and combinations of these metals. In some embodiments, seed elements 6 can include titanium (Ti) metal; chromium (Cr) metal; manganese (Mn) metal; iron (Fe) metal; or combinations of these metals. In some embodiments, seed elements 6 can be selected from metals that form FCC metal oxide crystal structures including, for example, cesium (Cs); barium (Ba); calcium (Ca); strontium (Sr); nickel (Ni); copper (Cu); palladium (Pd); silver (Ag); platinum (Pt); gold (Au); and combinations of these metals. In some embodiments, seed elements can be selected from metals that form cubic metal oxide crystal structures including cobalt (Co); nickel (Ni); copper (Cu); zinc (Zn); scandium (Sc); vanadium (V); and combinations of these metals. In some embodiments, seed elements can be selected that from tetragonal metal oxide crystal structures include lead (Pb); tin (Sn); indium (In); and combinations of these metals. In some embodiments, seed elements can be selected from zirconium (Zr); cadmium (Cd); technetium (Tc); ruthenium (Ru); yttrium (Y); niobium (Nb); tantalum (Ta); tungsten (W); Iridium (Ir); and combinations of these metals.

Binders 8 suitable for use in preparing the metal powder/polymer binder slurries 14 facilitate attachment of the precursor materials to the surface of the metal substrates 12 before drying or heating the precursor materials thereon. Exemplary organic binders 8 include HERAEUS V-006® (Heraeus Electronics), an ethyl cellulose-based resin binder; and ESL-450® (ESL ElectroScience Laboratories), a cellulose-based binder. Other binders can also be envisioned. Binders 8 suitable for use do not react with aluminum 4 or seed elements 6 in the precursor materials 14 and do not degrade when precursor materials are heated. Importantly, these binders 8 do not alter the aluminum metal 4 oxidization temperatures or alumina forming and coating temperatures at the surface of the metallic substrates 12.

Organic solvents 10 utilized to prepare the precursor materials 14 can be selected depending on such factors as the choice of binder 8 and the method of delivery. Organic solvents 10 suitable for use do not degrade or react with metals 4, 6 in the metal powder/polymer binder slurry. In the instant embodiment, an exemplary and preferred organic solvent 10 for preparation of a slurry comprised of the metal powder/polymer binder slurry is isopropanol (IPA) that permits viscosities of the precursor slurry to be tailored and that is easily removed once the precursor slurry is delivered or applied to the metallic substrate 12 and subsequently dried and/or heated. Other suitable solvents may also be selected.

Substrates having Cr and/or Fe 12 suitable for use include ferritic-based alloys such as corrosion resistant stainless steels; nickel alloys; titanium alloys; cobalt alloys including combinations of these various metal alloys. Embodiments of the instant disclosure also permit metals and metal alloys having lower melting point temperatures to be used including alkali metal alloys. In certain embodiments the substrates comprise alloys having a melting temperature lower than that of steel. In certain embodiments, substrates can comprise alloys having a melting point between 660° C. and 1500° C. Some examples can include cadmium alloys; tin alloys; zinc alloys; bismuth alloys; gallium alloys; lead alloys; indium alloys; and thallium alloys. Additional examples can include alloys of beryllium, silicon, calcium, scandium, manganese, cobalt, nickel, copper, germanium, strontium, silver, barium, lanthanum, neodymium, praseodymium, and promethium Metal powder/polymer binder slurries 14 such as described herein can be applied by any method that results in the formation of a generally uniform metal-containing precursor layer on the metallic substrate 12, and that has a suitable or selected thickness. Layer 14 thicknesses are not limiting. For example, in some embodiments, precursor layer 14 thickness is selected preferably between about 5 to about 10 micrometers. In some embodiments, precursor layer 14 thickness is selected between about 50 to about 100 micrometers.

Thickness of the metal powder/polymer binder slurry 14 on the surface of the metal substrate 12 can affect the rate at which penetration and diffusion of aluminum metal 4 into the metal substrate 12 occurs. This rate of diffusion is moderated by the presence of seed elements 6 in the slurry. Thickness also affects the oxidation rate of the aluminum metal 4 in the slurry. These competing processes affect the temperature at which formation of gamma (γ) alumina (i.e., γ-Al2O3) 16 and stable alpha (α) alumina (i.e., α-Al2O3) 18 form at the surface of the metal substrate 12, as detailed further herein.

The metal-containing precursor layer 14 introduced onto the surface of the metal substrate 12 can be dried by any method that both removes the solvent liquid 10 from the slurry layer 14 and affixes the slurry layer 14 to the surface of the metal substrate 12. In one example, the metal-containing slurry layer 14 can be dried in air at a temperature of greater than or equal to about 80° C., for example, to remove the slurry solvent 10 and form a dry and uniform metal-containing layer 20 on the surface of the metal substrate 12 prior to the heating step that forms the alumina coating 22 thereon. In another example, the temperature is less than or equal to approximately 110° C.

The dried metal-containing slurry layer on the surface of the metal substrate 12 can be heated in air to slowly ramp the temperature to the selected alumina-forming/aluminum-infusing (heating) temperature. Ramp rates for increasing temperature to the selected alumina forming temperature are preferably selected at or below about 3° C. per minute to provide the lowest possible temperatures for forming alumina coatings 22 on surfaces of metal substrates 12 but are not intended to be limited thereto. For example, other heating rates can also be utilized. In various tests, ramp rates of 3° C. per minute; 5° C. per minute; 10° C. per minute; 15° C. per minute; and 20° C. per minute were utilized, as described elsewhere herein.

In various embodiments, alumina forming temperatures can be selected from about 600° C. to about 1300° C. A preferred alumina forming temperature is less than or equal to 1000° C. In one example, the temperature is less than or equal to about 900° C. In other examples, the temperature is less than or equal to 875° C., 850° C., or 825° C. In another example, the temperature is greater than or equal to about 700° C. The low alumina forming and aluminum infusing temperature are attributed to the inclusion of a seed element in the metal powder/polymer binder slurry. Thus, in applications where lower melting temperature metallic substrates are utilized, alumina-forming temperatures can be selected at the lower end of the temperature range to preserve the integrity of the metal substrate. The alumina-forming step enables aluminum metal 4 in the precursor slurry to undergo oxidation that forms the aluminum oxide coating 20 at the surface of the substrate 12 and simultaneously allows aluminum metal 4 in the metal precursor layer 14 to diffuse into the matrix 16 of the underlying substrate 12. At these temperatures, aluminum metal 4 penetrates the surface of the metallic substrate 12 and diffuses to a selected depth or thickness within the matrix 16 of the metallic substrate 12 forming a graded penetration (diffusion) zone 22 therein of a selected thickness or depth that prevents release of volatile chromium species from the matrix 12 during high temperature operation. The aluminum penetration zone 22 can also serve to anchor the alumina coating 20 to the metal substrate 12 so that the alumina coating 20 does not spall at high-temperature operation conditions.

Times selected for heating the metal substrate 12 to form the aluminum oxide coating 20 depend on various factors including the choice of metal or metal alloy of the chosen metal substrate or component to be coated; metals 4, 6 selected for the metal containing precursor 2; metal concentrations in the metal containing precursor; quantity of binders 8 and solvents 10 in the metal containing precursor 2; thickness of the metal containing precursor layer 14 on the surface of the metal substrate 12; surface area covered by the metal containing precursor layer 14; depth/thickness of the penetration zone 22 in the metal matrix 16; other surface factors such as uniformity and porosity; particle size; and combinations of these various factors. In some embodiments, heating times range from about 15 minutes to about 1 hour but are not intended to be limited. In other examples, the heating time is less than 2 hours. Longer and shorter times may be selected depending on the various factors discussed above.

Aluminum metal 4 and seed elements 6 selected for use in the metal containing precursor slurry can have a wide range of particle sizes. Average particle diameters can be selected from about 10 nm to about 1000 μm; from about 1

μm to about 45 μm; or from about 3 μm to about 4 μm. The size of the particles and the size distribution can affect uniformity of the metal precursor layer 14 on the surface of the metal substrate 12.

Size of metal particles in the metal binder/polymer binder slurry 14 can also affect rates of oxidation at the surface of the metallic substrates 12 and rates of diffusion into the matrix 16 of the metallic substrates 12. Rates of oxidation of the alumina 4 particles (and seed element 6 particles) and diffusion of the aluminum metal 4 particles are given by Equations [1] and [2]:

$$\text{rate}_{oxid} = \alpha 4\pi r^2 \quad [1]$$

$$\text{rate}_{diff} = \alpha 1.333\pi r^3 \quad [2]$$

where alpha (α) is the fractional reaction ratio at a selected temperature described further herein; and (r) is the particle radius. During the alumina 20 forming step, aluminum metal 4 in the precursor slurry layer 14 oxidizes to form α-aluminum oxide ($Al_2O_3$) coating 20 at the surface of the metal substrate 12 while aluminum metal 4 diffuses into the matrix 16 of the metal substrate 12 at the penetration zone 22. Rates of oxidation and diffusion compete at any given temperature.

In general, the larger the metal 4, 6 particles, the lower the surface area of the particle available for oxidation and the higher the rate of diffusion of aluminum metal 4 into the matrix 16 of the metal substrate 12. Conversely, the smaller the relative particle sizes, the lower the rate of diffusion of aluminum metal 4, as a greater fraction of aluminum metal 4 can be consumed during heat treatment via oxidation in the air leaving less aluminum metal 4 available to diffuse into matrix 16 of the metal substrate 12. These competing processes thus affect the thickness of the alumina coating 20 formed on the surface of the metal substrate 12 and the penetration depth or thickness of the resulting aluminum penetration/diffusion zone 22 in the matrix 16 of the metal substrate 12. In certain embodiments, penetration depths of aluminum metal 4 within the substrate matrix 16 at the penetration zone 22 are preferably from 150 μm to 200 μm. In certain embodiments, the thickness of the alumina coating 20 at the surface of the metal substrate 12 is preferably from 0.5 μm to 1 μm after removing an surface debris.

The seed element 6 in the metal powder/polymer binder slurry can affect the respective oxidation and diffusion rates of the aluminum metal 4, by reducing the rate of oxidation of the aluminum metal 4 which enhances the rate of diffusion of aluminum metal 4 into the matrix 16 of the metal substrate 12. The competing oxidation and diffusion rates of aluminum metal 4 and the influence of the seed elements 6 determine the resulting penetration depth of aluminum metal 4 within the matrix 16 of the metal substrates 12 and the formation temperature of the resulting aluminum oxide layer 20 at the surface of the metallic substrate 12. The aluminum diffusion zone 22 forms as a gradient with a higher concentration of aluminum metal 4 positioned near the surface of the metallic substrate 12, and a lower concentration of aluminum metal 4 positioned at the deeper end (i.e., greatest depth) within the diffusion zone 22. Controlling the penetration depth (thickness) of the aluminum metal 4 to within selected ranges or thicknesses enhances the strength of the alumina coating 20 at the surface of the metallic substrate 12 that in turn affects the ability of the alumina coating 20 to resist spalling and to prevent release of chromium species from the matrix 16 during high temperature operation preventing metal embrittlement and cathode poisoning by released chromium.

Figures 2A, 2B:
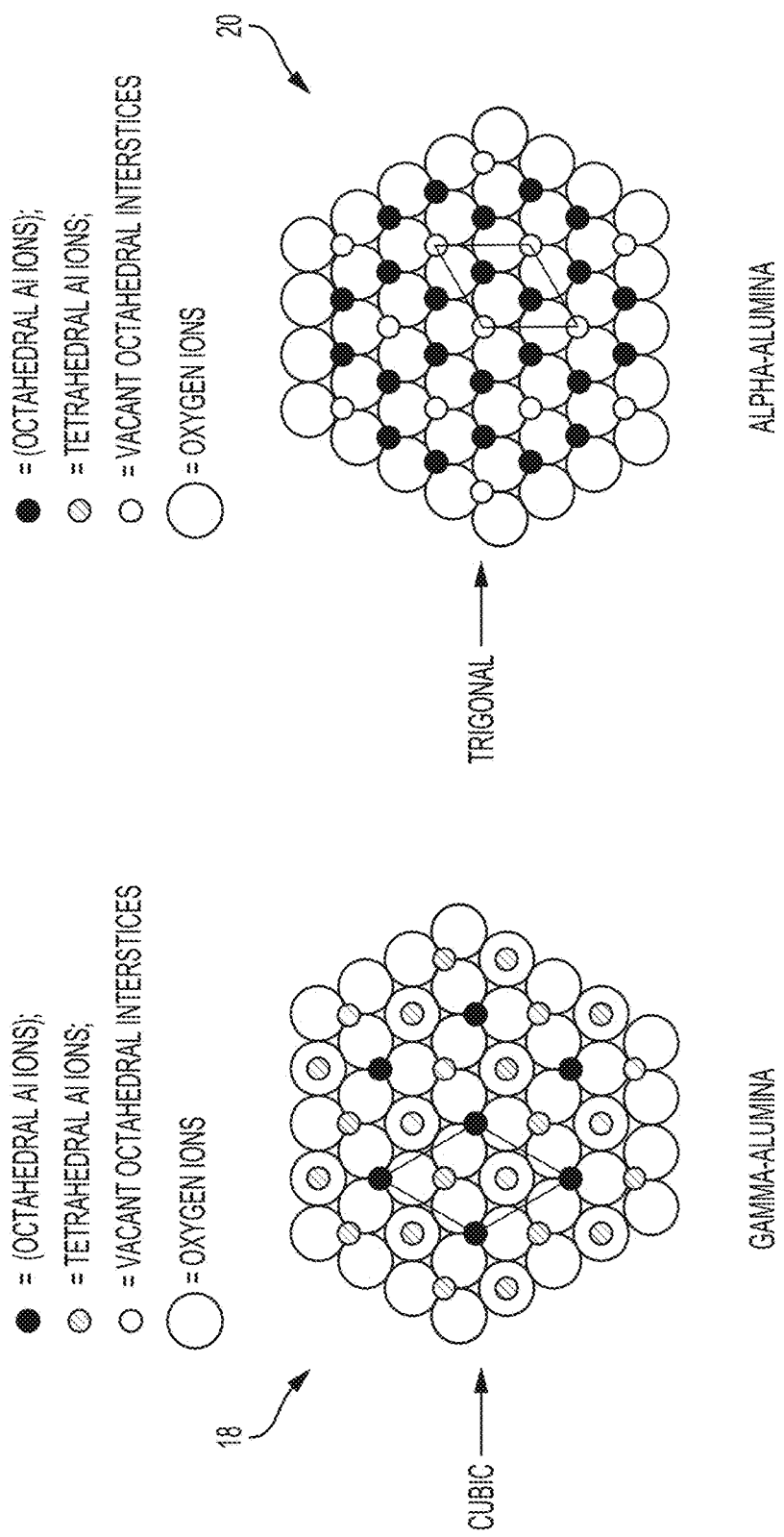
FIGS. 2A-2B illustrate the metal oxide crystal structures of α-aluminum oxide and α-aluminum oxide, respectively.

Unexpectedly, diffusion of aluminum metal 4 into the matrix 16 of the underlying metallic substrates 12 proceeds at a rate significantly faster than the diffusion of seed elements 6 in the dried metal-containing precursor layer 14 limiting uptake of seed elements 6 in the matrix 16 of the metallic substrate 12. Addition of seed elements 6 in the metal-containing precursor slurry also reduces temperatures at which aluminization of the metal substrate 12 takes place. Results also show that alumina coatings 20 produced at these lower forming temperatures form without compromising physical properties of the metallic substrates 12. These lower forming temperatures enable various low-temperature metals and alloys to be coated with these protective coatings 20 without compromising the integrity of the metallic substrates 12. Results in some embodiments can be attributed to the formation of seed element oxides that have a cubic crystal structure such as a face-centered cubic crystal structure that is similar to the cubic crystal structure of γ-alumina 18 shown in FIG. 2A or the trigonal crystal structure of α-alumina 20 as shown in FIG. 2B. The symmetry between these similar crystal structures appears to lower the formation energy and hence the temperature of formation of γ-alumina 18 at the surface of the metal substrate 12. These protective alumina coatings 22 thus form at a substantially lower process temperature in the presence of these seed elements 6. These inventors are the first to demonstrate that aluminization of metallic substrates 12 can be performed at temperatures less than or equal to 1000° C. and as low as 600° C. utilizing aluminum metal 4 in combination with these seed elements 6.

Experimental

Various mixed metal powders were prepared to contain aluminum without a seed element present (Sample A) and with some amount of a seed element including Ti (Sample AT); Mn (Sample AM); Cr (Sample AC); and Fe (Sample AF). Seed elements comprised 20% of the total metal weight in the mixed metal powders, representing 20% Al metal and 5% seed element by total weight of the metal powder/polymer binder slurry, respectively. Powders included particles at three selected sizes, 0.1 μm, 4 μm, and 45 μm combined with the selected binder. 25% metal powder-binder mixtures by weight were analyzed by DSC and TGA.

Metal powders were then combined with the ESL binder and isopropanol solvent in a ratio of 25% metals; 25% binder; and 50% solvent by weight to form mixed metal precursor slurries. Slurries were applied to stainless steel coupons and dried to form a metal containing precursor layers on the surface of the metal coupons. Precursor layers were then slowly ramped in temperature by heating in air to an alumina-forming temperature selected in the range from about 600° C. to about 1000° C. In various tests, ramping rates were selected from at or less than about 3° C. per minute; 5° C. per minute, 10° C. per minute, 15° C. per minute, and 20° C. per minute Coupons were then heated at the selected alumina-forming temperatures for a time sufficient to form the alumina coating on the surface of the metal substrates. Typical times for alumina forming were typically from about 15 minutes to about 1 hour on average.

Figure 3B:
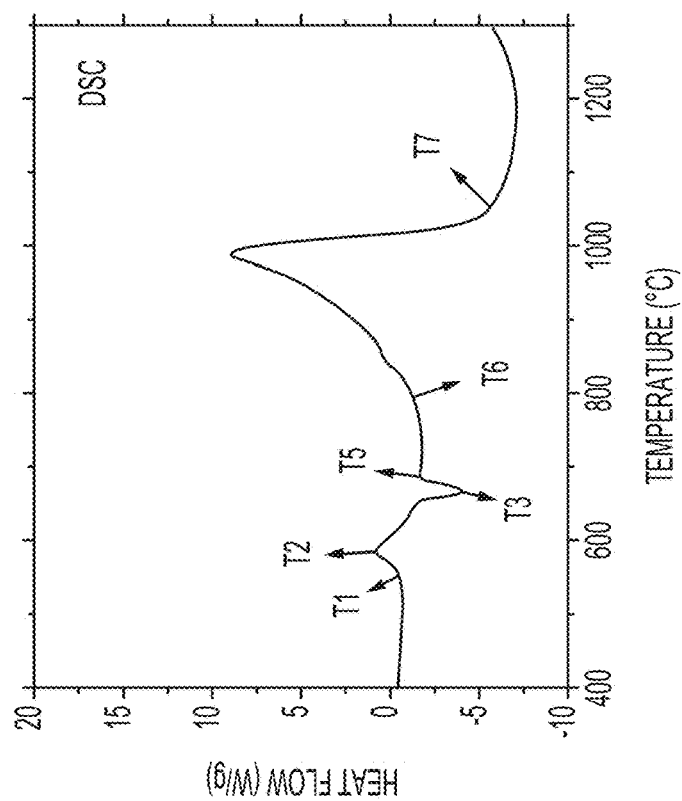
FIGS. 3A-3B are TGA and DSC plots showing changes in mass and energy in mixed metal powder slurries as a function of temperature, respectively. Transitions of metal-containing precursors to alumina are observable.
Figure 3A:
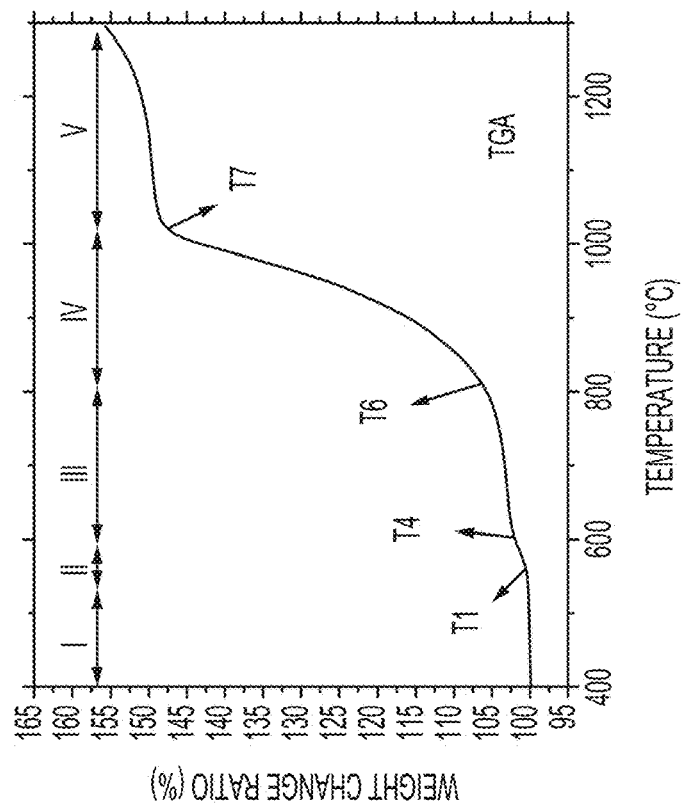

FIG. 3A shows changes in mass in a representative aluminum metal powder due to the formation of aluminum oxides as a function of temperature. Five distinct mass change zones (I through V) were identified for the tested sample with temperatures at selected points in the figure labeled as T1, T4, T6, and T7, respectively. FIG. 3B shows corresponding energy changes that occur as a function of temperature, with temperatures at selected points in the figure labeled as T1, T2, T3, T5, and T7, respectively. In these figures, the onset of oxidation of the aluminum metal is observed beginning at temperature T1 (~560° C.) which ceases at temperature T4 (600° C.). Oxidation of aluminum metal 4 in the precursor material 2 is an endothermic process, and the input of heat energy (heat flow) is observed in the thermogram (FIG. 3B) between temperatures T1 and T2. Multiple energy transitions (define) corresponding to different are observed in the thermogram at temperatures T2 (from about 580° C. to about 640° C.); T3 (about 660° C. to about 670° C.); and T5 (from about 680° C. to about 800° C.). As oxidation ceases at temperature T4, the aluminum metal begins to melt, and a melting transition is observed in the thermogram at temperature T3 (about 660° C.). The melting endpoint is also observed in the thermogram at temperature T6 (about 825° C.). Little mass gain is observed between temperature T4 and T6 over the temperature range from about 600° C. to about 825° C. in the first figure. The rise in mass observed in FIG. 3A between temperatures T6 (about 825° C.) and T7 (~1050° C.) corresponds to continued oxidation of aluminum metal and a phase change in alumina from γ-alumina 18 to α-alumina 20 takes place. Multiple energy transitions are observed in the thermogram in this temperature range.

Fractional Reaction (α) is a measure of mass changes within a selected temperature range or temperature zone calculated as a ratio that permits energy (E) for reactions as a function of temperature (T) to be calculated. Equations relevant to calculation of Fractional Reaction values and corresponding energy values are given in Equations [3]-[8]:

$$Inf(\alpha) = \ln\left(\beta \cdot \frac{C}{A}\right) + \left(\frac{E}{RT}\right) \quad [3]$$

$$T = T_0 + \beta \cdot t \quad [4]$$

$$k = A \cdot \exp\left(-\frac{E}{RT}\right) \quad [5]$$

$$\frac{d\alpha}{dt} = k \cdot f(\alpha) \quad [6]$$

$$\frac{dT}{dt} = \beta \quad [7]$$

$$\frac{d\alpha}{dT} = C \quad [8]$$

Here (f) is the function; (k) is reaction rate constant; (α) is the fractional reaction value; (T) is the temperature; (t) is the time; (β) is the temperature ramp rate per unit time; and (C) is the change in fractional reaction value as a function of change in temperature.

Fractional Reaction (α) values for the oxidation of (Al) metal to form γ-alumina (γ-Al$_2$O$_3$) in Zone II over the temperature range from T1 (from about 550° C.) to T4 (about 600° C. immediately prior to melting) is given by Equation [9]:

$$\alpha = \frac{\Delta m_T - \Delta m_{T1}}{\Delta m_{II}} \quad [9]$$

Figure 4B:
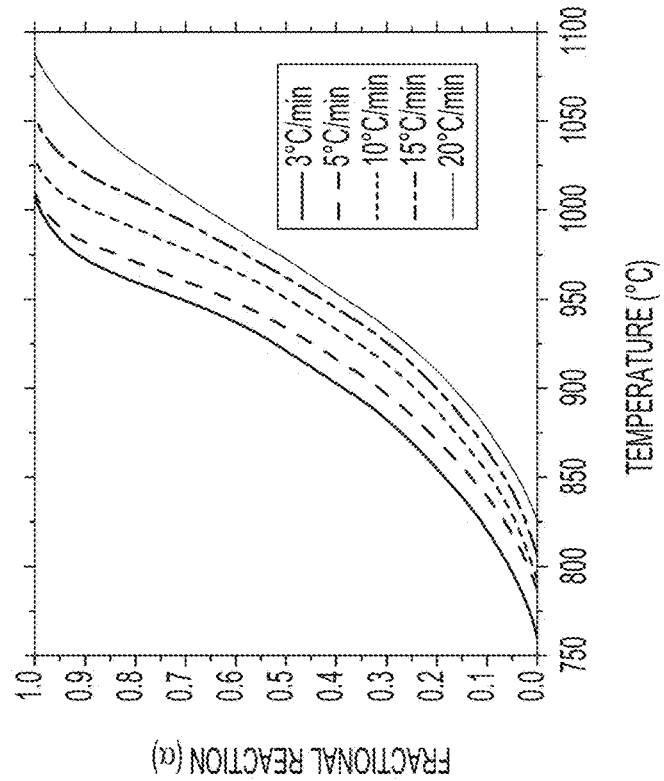
FIG. 4A-4B plot Fractional Reaction (α) values for oxidation of aluminum metal in metal powder/polymer binder slurries having a seed element for selected temperature ranges (Zone II and Zone IV, respectively) as a function of heating rate.
Figure 4A:
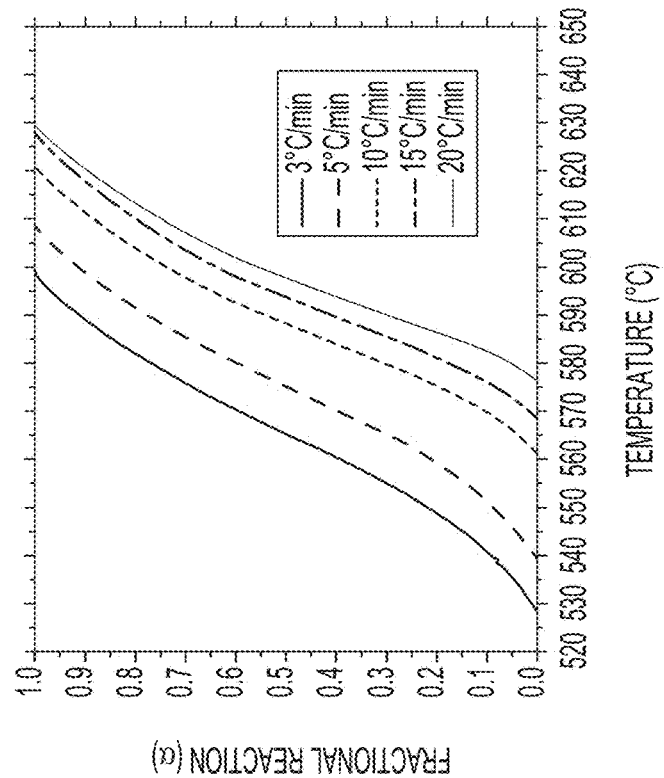

Here $\Delta m_T$ represents the weight gain of the sample at arbitrary time t (or temperature T) in between T1 (about 400° C.) and T4 (about 600° C.).; $\Delta m_{T1}$ is the change in mass beginning at Zone II (temperature T1, about 560° C.) to the end of Zone II (temperature T4, about 600° C.); and $\Delta m_{II}$ is the total change in mass in Zone II over the temperature range from T1 to T4 (from about 560° C. to about 600° C.) where oxidation of aluminum metal begins, and formation of γ-alumina takes place prior to melting (temperature T3 in DSC heat flow diagram FIG. 3B). FIG. 4A plots Fractional Reaction (α) values over the temperature range from T1 (about 560° C.) to T4 (600° C.) as a function of heating rate. Results show a shift in Fractional Reaction values as the heating rate increases. Fractional Reaction (α) values for formation and placement of the alumina coating at the surface of the metal substrate over this temperature range are given by Equation [10] as follows:

$$\alpha = \frac{\Delta m_T - \Delta m_{T6}}{\Delta m_{IV}}. \quad [10]$$

Here $\Delta m_T$ represents the weight gain of the sample at arbitrary time t (or temperature T) in between T6 (about 825° C.) and T7 (about 1050° C.) and; $\Delta m_{T6}$ is the change in mass beginning at T6 (about 825° C.) to the end of T7 (about 1050° C.); and $\Delta m_{IV}$ is the total change in mass in zone IV, which in this metal mixture takes place over the temperature range from T6 (about 810° C.) to T7 (about 1050° C.) where formation of the α-alumina on the metallic substrate generally begins and ends. FIG. 4B plots Fractional Reaction (α) (FR) values over this temperature range as a function of heating rate. Results show temperatures shift low-temperature with decreasing heating rate. TABLE 1 lists activation energy values (kJ/Mole) for Zone II (oxidation) and Zone IV (alpha α-alumina placement on metal surface or substrate) as a function of heating rate.

TABLE 1

| | Heating Rate | | | | |
|---|---|---|---|---|---|
| | 3° C./min | 5° C./min | 10° C./min | 15° C./min | 20° C./min |
| Zone II | 432 | 453 | 503 | 505 | 540 |
| Zone IV | 264 | 289 | 284 | 282 | 264 |

Figure 5:
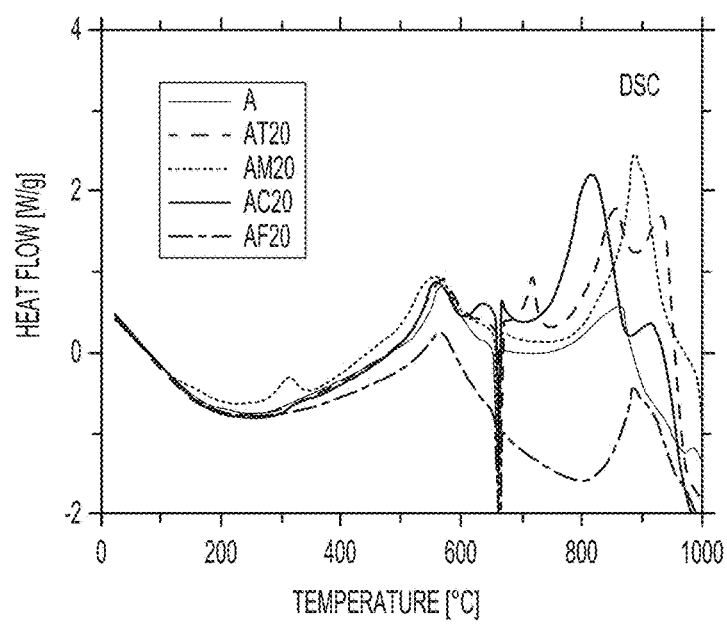
FIG. 5 presents DSC plots for various metal powders as a function of temperature (Zone II and Zone IV).

Results show that oxidation temperature of the aluminum metal to gamma (γ)-alumina in Zone II and oxidation temperature of aluminum metal in Zone IV to form (α)-alumina both occur at lower temperatures as heating rate decreases. These data show a heating rate less than or equal to about 3° C. per minute provides oxidation at the lowest possible temperature requiring a lower energy to effect oxidation. The energy needed to oxidize aluminum metal increases with increases in heating rate. FIG. 5 compares DSC heat flow diagram for each of the dual metal powders as a function of temperature (Zone II and Zone IV) against that for an aluminum-only RAA sample. TABLE 2 lists activation energy ($E_{act}$) values (kJ/Mole) for Zone II and Zone IV as a function of aluminum particle size in the pure aluminum metal.

TABLE 2

| | Particle Size | | |
|---|---|---|---|
| | 0.1 µm | 4 µm | 45 µm |
| Zone II | 342 | 417 | 522 |
| Zone IV | 132 | 253 | 311 |

Results show that ($E_{act}$) required to oxidize aluminum metal to (γ)-alumina in Zone II and energy ($E_{act}$) required oxidizing aluminum metal to form (α)-alumina in Zone IV decrease as the size of particles decreases. TABLE 3 lists increases in sample weight (wt %) due to oxidation of alumina metal over the temperature range from about 600° C. to 1000° C. with mixed metal precursor slurry.

TABLE 3

| | Sample: | | | | |
|---|---|---|---|---|---|
| Temp.: | A (wt %) | AT20 (wt %) | AM20 (wt %) | AC20 (wt %) | AF20 (wt %) |
| 600° C. | 3.7730 | 4.1941 | 9.6082 | 4.6349 | 8.1278 |
| 700° C. | 5.6821 | 6.7238 | 11.9412 | 9.6798 | 10.2529 |
| 800° C. | 14.405 | 22.0028 | 22.4529 | 30.9647 | 21.5375 |
| 900° C. | 27.1760 | 34.3700 | 49.9072 | 38.9531 | 36.2843 |
| 1000° C. | 35.2726 | 38.3871 | 45.2309 | 41.8247 | 47.9217 |

A = Aluminum (Al); AT20 = [Aluminum: 20 wt % Titanium (T)]; AM20 = [Aluminum: 20 wt % Manganese (M)]; AC20 = [Aluminum: 20 wt % Chromium (C)]; AF20 = [Aluminum: 20 wt % Iron (Fe)].

Weight increases shown in the table correspond to the uptake of oxygen during oxidation of aluminum metal in the metal-containing precursor slurry that forms the aluminum oxide at the specified temperature. Samples containing dual metal powders show a substantial weight increase at temperatures 100° C. lower than the aluminum only samples on average demonstrating a lower aluminum oxide formation temperature in these samples.

Figure 6A:
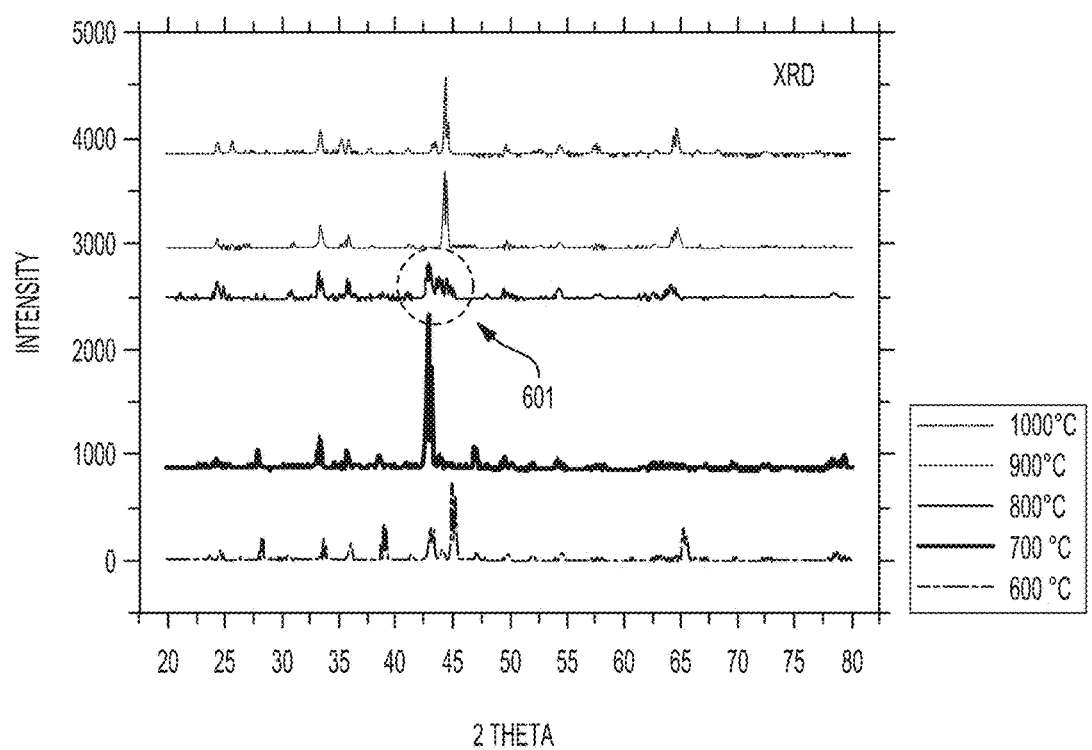

FIG. 6A is an XRD plot showing changes in the crystal structure of an aluminum metal sample with no seed element as a function of temperature displaying changes in the aluminum metal as aluminum oxide forms. Results show crystal structure of the penetrated aluminum metal begins to make aluminum alloy and that alloy change 601 to the steel alloy form at a temperature of about 800° C. with an increase in the quantity of aluminum oxide after that. Therefore, stable alpha alumina starts to forming around 900° C. FIG. 6B and FIG. 6C are XRD plots that compare changes 602 and 603 in the crystal structure of penetrated aluminum metal alloy to steel alloy and aluminum oxide in mixed metal slurry powders comprised of aluminum metal and titanium metal (AT20) and manganese metal (AM20), respectively. Results show the penetrated aluminum alloy change into steel alloy occurs at 700° C. Hence, the stale alpha alumina starts to forming around 800° C. in these mixed metal powders approximately 100° C. below the aluminum-only sample formed at 900° C.

Figure 7A:
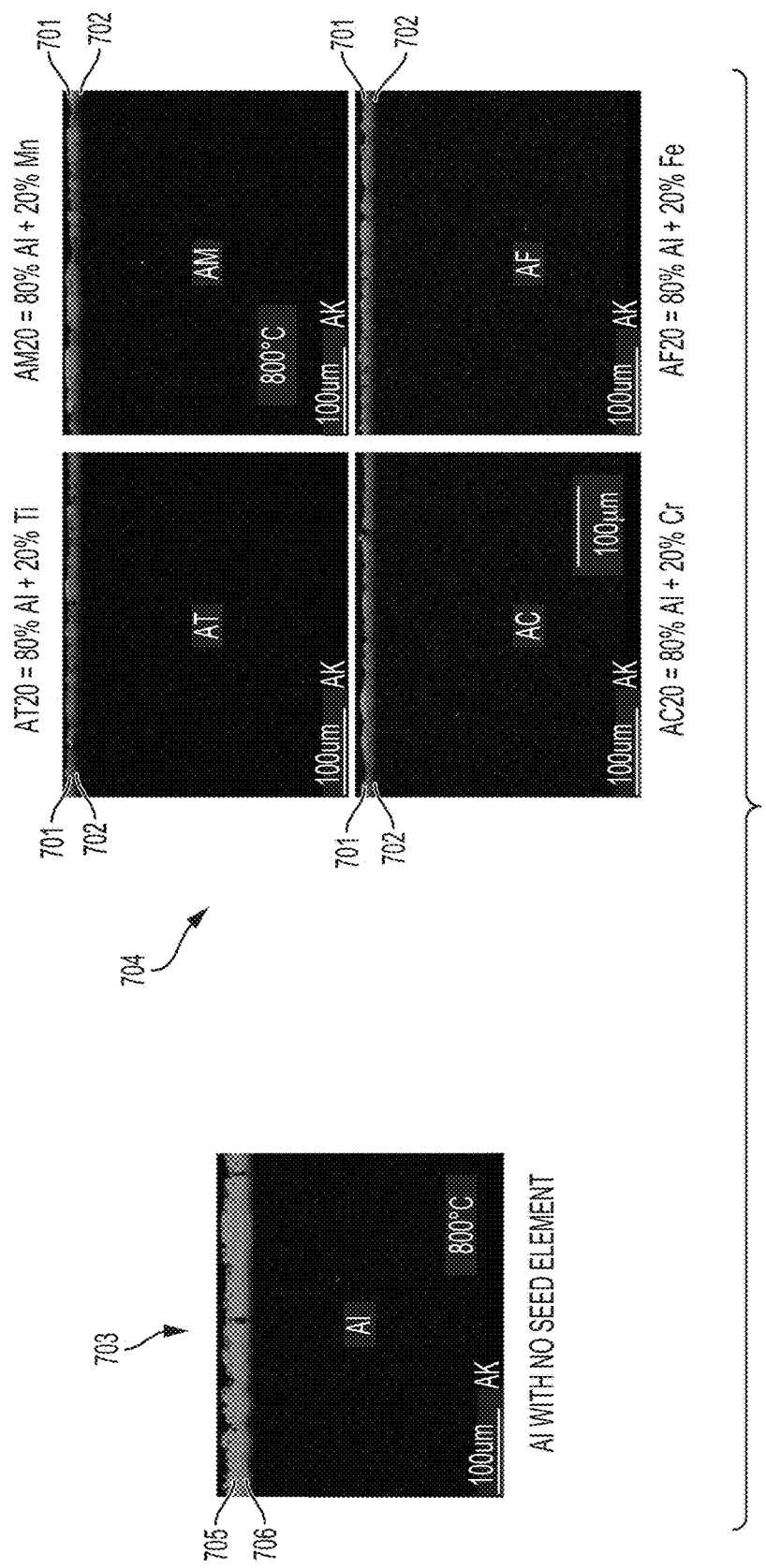
FIG. 7A-7C presents SEM images showing penetration depth of aluminum metal diffusion zone in the metallic substrate as a function of temperature when utilizing a seed element, according to embodiments described herein.
Figure 7B:
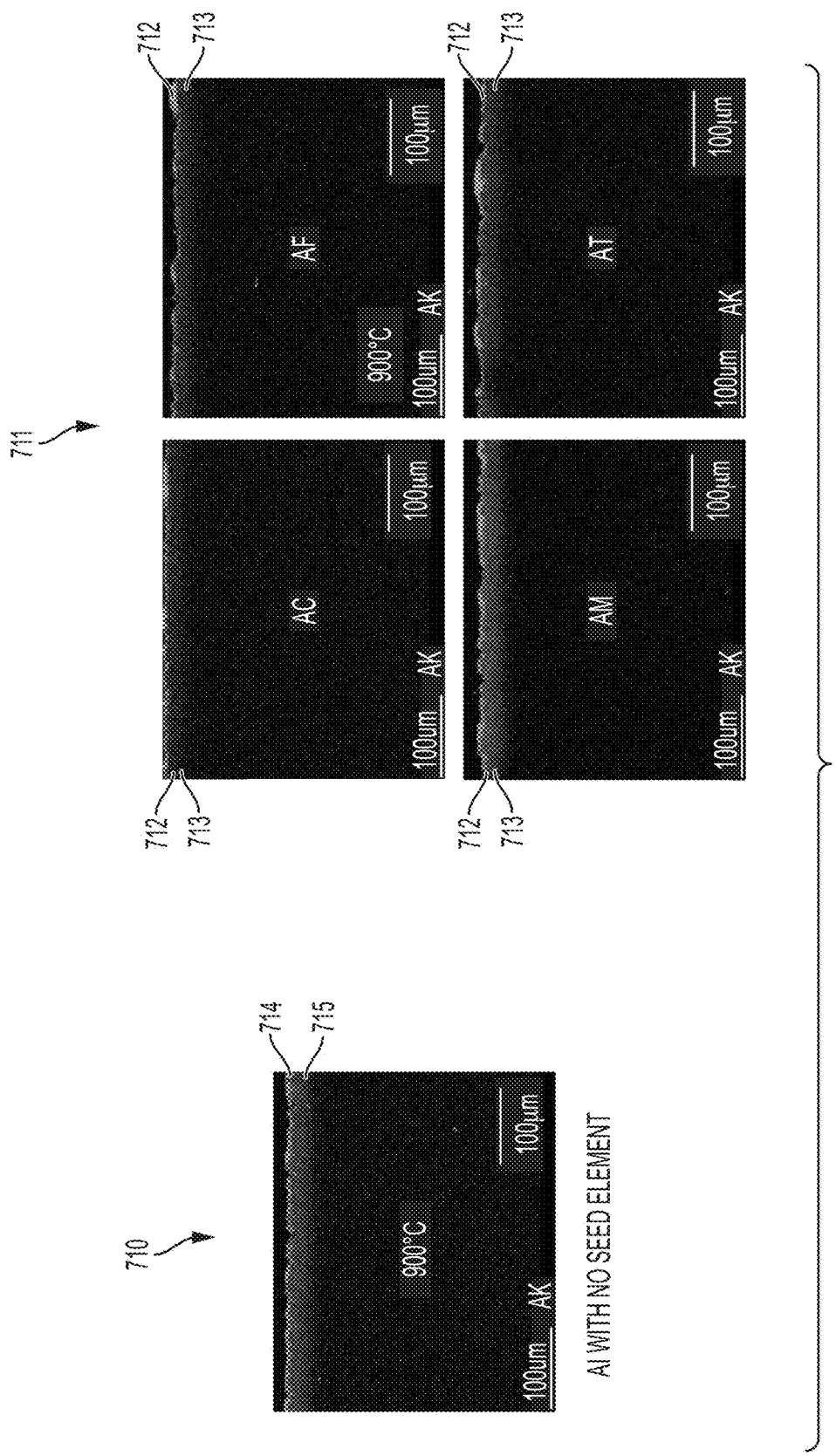
Figure 7C:
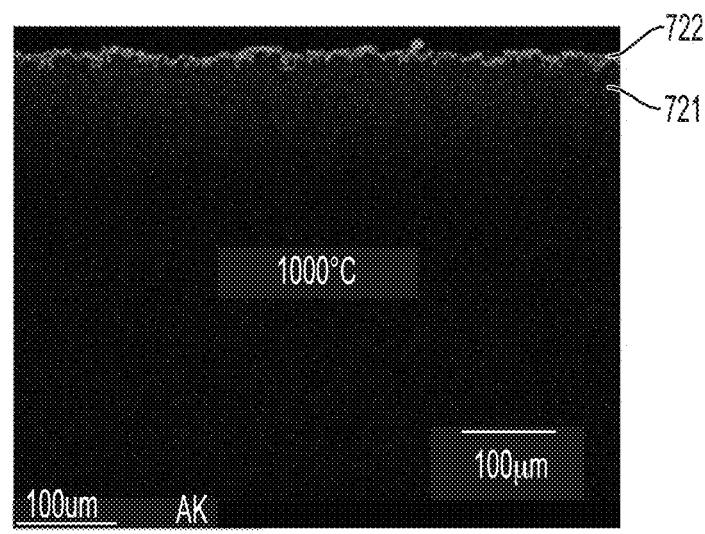

Similar results are shown in another set of tests. FIG. 7A compares scanning electron micrograph (SEM) images of alumina coatings formed on stainless steel metal coupons at 800° C. prepared from dual metal slurry samples comprised of aluminum metal and a seed element 704 of the instant disclosure against an aluminum-only metal sample 703 prepared by the previous RAA approach. Results in these figures show that addition of a seed element in the precursor slurry that forms a cubic or a tetragonal or a trigonal metal oxide crystal structure yields a significantly thicker and dense alumina coating 701 on the surface of the metal coupons and an aluminum metal penetration zone 702 of a considerably lower penetration depth compared to the coating 705 and penetration zone 706 of the aluminum-only metal precursor coating sample at the same alumina forming temperature. FIG. 7B compares SEM images of alumina coatings formed on stainless steel metal coupons at 900° C. from dual metal slurry samples 711 of the instant disclosure against those prepared with an aluminum-only (i.e., no seed element) metal sample 710 at 900° C. FIG. 7C shows an aluminum-only (i.e., no seed element) metal sample at 1000° C. At the 900° C. forming temperature, results in FIG. 7B shows that addition of a seed element again yields a thicker and dense alumina coating 712 on the surface of the coupons and an aluminum metal penetration depth 713 significantly lower than the coating 714 and penetration zone 715 obtained from the corresponding aluminum-only metal sample at the same alumina forming temperature. Results in FIG. 7C show by comparison that addition of a seed element FIG. 7B results in almost a same amount decrease in both the penetration depth 721 of aluminum metal in the penetration zone of the metallic substrate and a increase thickness and density in the thickness of the alumina coating layer 722 formed at the surface of these metal coupons at a 100° C. lower alumina forming temperature than that obtained at 1000° C. from a process that does not include seed elements.

Results demonstrate that embodiments of the present disclosure provide processing temperatures for aluminization of metal surfaces and substrates that are substantially lower when utilizing a seed element. Said alternatively, the alumina coating and infused aluminum region at a given temperature when using seed elements in the metal powder/polymer binder slurry have qualities resembling those found at much higher temperatures when a seed element is absent.

Applications of the embodiments described herein can include formation of aluminum oxide coatings on various devices or device parts at lower temperatures. These devices can comprise SOFCs stacks and interconnects; boiler devices; and power plants including nuclear power plants.

While many embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

What is claimed is:

1. A method for both coating a substrate with aluminum oxide and infusing the substrate with elemental aluminum, the method comprising:
   providing a substrate having a Cr-containing surface;
   providing a metal powder/polymer binder slurry, the slurry comprising:
   a solvent;
   an organic binder;
   metal granules, wherein the metal granules comprise Al; and
   a seed element;
   dispersing the slurry upon the Cr-containing surface;
   after dispersing the slurry, exposing the slurry to air and maintaining the temperature of the slurry and substrate below 110° C., to remove at least a portion of the solvent from the slurry; and
   after removing at least a portion of the solvent from the slurry, in a combined step, both exposing the binder, metal granules, seed elements, and substrate to air and heating the remaining slurry and substrate at a temperature less than or equal to 1000° C. to:

diffuse the at least a portion of the metal of the metal granules into the substrate;

oxidize the seed elements to form one or more of a cubic crystal lattice structure, a tetragonal metal oxide crystal structure, and/or a trigonal metal oxide crystal structure; and coat the substrate with aluminum oxide.

2. The method of claim 1, wherein said maintaining further comprises maintaining the temperature of the slurry and substrate above 80° C.

3. The method of claim 1, wherein said heating comprises heating at a temperature between 700° C. and 900° C.

4. The method of claim 1, wherein the seed element comprises Ti.

5. The method of claim 1, wherein the seed element comprises Cr.

6. The method of claim 1, wherein the seed element comprises Mn.

7. The method of claim 1, wherein the seed element comprises Fe.

8. The method of claim 1, wherein the substrate has a Cr—Fe containing surface.

9. The method of claim 8, wherein the Cr—Fe-containing surface further comprises one or both of Co and Ni.

10. The method of claim 1, the metal granules on average are between 0.1 and 45 µm in diameter.

11. The method of claim 1, wherein the metal powder/polymer binder slurry comprises organic constituents that carburize and/or volatilize at temperatures near or above the melting point of the metal.

12. The method of claim 1, wherein during the combined step at least a portion of the aluminum is oxidized.

13. The method of claim 1, wherein the metal of the metal granules comprises an aluminum alloy.

14. The method of claim 1, wherein the binder of the metal powder/polymer binder slurry is an organic based system having a final evaporation or decomposition temperature greater than 100° C.

15. The method of claim 1, wherein during the exposing the slurry to air and maintaining the temperature of the slurry and substrate below 110° C. step, the metal of the metal powder/polymer binder slurry remains unoxidized.

16. The method of claim 1, wherein the metal powder/polymer binder slurry comprises a ratio of binder to powder within the range of 10:1 to 1:10 by volume.

17. The method of claim 1, wherein the dispersing the slurry upon the Cr-containing surface comprises applying the slurry by spray dispensing, paste dispensing, painting, dip coating, stencil printing, or screen printing.

18. The method of claim 1, wherein the aluminum oxide comprises α-aluminum oxide.

19. The method of claim 1, operating as a continuous process on a plurality of substrates.

20. The method of claim 1, wherein the metal substrate is a component of a solid oxide fuel cell stack or a boiler device.

* * * * *

UNITED STATES PATENT AND TRADEMARK OFFICE
CERTIFICATE OF CORRECTION

PATENT NO. : 10,577,694 B2
APPLICATION NO. : 15/867370
DATED : March 3, 2020
INVENTOR(S) : Jung-Pyung Choi and Jeffry W. Stevenson It is certified that error appears in the above-identified patent and that said Letters Patent is hereby corrected as shown below:

In the Specification

Column 1, Line 10 – Replace "of currently U.S. patent" with --of currently pending U.S. patent--

Column 5, Line 2 – Replace "of α-aluminum" with --of γ-aluminum--

Column 6, Line 15 – Replace "from Group D3" with --from Group IB--

Column 6, Line 20 – Replace "6 be selected" with --6 can be selected--

Column 6, Line 26 – Replace "Chrominum" with --Chromium--

Column 6, Line 54 – Replace "that from" with --that form--

Column 6, Line 55 – Replace "include lead" with --including lead--

Column 7, Line 37 – Replace "and promethium" with --and promethium.--

Column 9, Line 43 – Replace "removing an" with --removing any--

Column 10, Line 56 – Replace "minute Coupons" with --minute. Coupons--

Column 13, Table 3 – Replace "49.9072   38.9531   36.2843
                                45.2309   41.8247   47.9217" with
                              --49.9072   38.9531   36.2843
                                45.2309   41.8247   47.9217 --

Column 13, Line 55 – Replace "starts to forming" with --starts to form--

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*